United States Patent [19]

Lewis

[11] Patent Number: 5,525,990

[45] Date of Patent: Jun. 11, 1996

[54] COHERENT ANTENNA SIDELOBE SUPPRESSION SYSTEM

[75] Inventor: Bernard L. Lewis, Ft. Washington, Md.

[73] Assignee: The United States of America as represented by the Secretary of the Navy, Washington, D.C.

[21] Appl. No.: 477,480

[22] Filed: Mar. 17, 1983

[51] Int. Cl.⁶ .................................................. G01S 13/00
[52] U.S. Cl. ............................................... 342/39; 342/374
[58] Field of Search ................................... 343/374, 371, 343/372, 17.2 PC; 342/374, 371, 372, 39

[56] References Cited

U.S. PATENT DOCUMENTS 3,412,405  9/1964  Crotty et al. .
4,045,800  8/1977  Tang et al. .
4,121,209  10/1978  ap Rhys .

*Primary Examiner*—Theodore M. Blum

[57] ABSTRACT

A sidelobe suppression system including an antenna with a variable phase center, a transmitter for transmitting an expanded phase-coded pulse, a receiver for receiving target echos, a pulse expander/compressor for phase coding the expanded transmitted pulse with a phase code, P, and for compressing target echos with unscrambled phase code P and a control unit for shifting the phase center of the antenna to scramble the phase codes of the expanded pulses transmitted into the antenna sidelobes.

15 Claims, 1 Drawing Sheet

5,525,990

COHERENT ANTENNA SIDELOBE SUPPRESSION SYSTEM

BACKGROUND OF THE INVENTION

The invention relates generally to antenna sidelobe reduction systems and more particularly to a system utilizing antenna phase center modulation.

The antenna pattern for a directional antenna includes a mainlobe and several sidelobes. The sensitivity of the antenna to these sidelobes decreases the directivity of the antenna. Various methods of reducing sidelobe sensitivity include amplitude tapers across the antenna aperture and coherent sidelobe cancelers. However, local scatterers in the vicinity of the antenna and phase and amplitude errors limit the sidelobe sensitivity reduction achievable by these methods.

An alternative method of sidelobe sensitivity reduction provides for rapidly moving the phase center of the antenna to Doppler shift the rf pulses transmitted into the sidelobes. The Doppler shifted echos from off-axis targets are blocked by a filter thereby decreasing sidelobe sensitivity. U.S. Pat. No. 3,412,405 issued to Crotty et al. discloses this type of system.

In order to induce the Doppler shifts in sidelobe pulses, the rate of change of the phase center position must be extremely high. This high speed phase center modulation requires a costly and complex modulation system.

OBJECT OF THE INVENTION

Accordingly, it is an object of the invention to increase the effective antenna mainlobe to sidelobe gain ratio realized by existing systems.

It is a further object of the invention to reduce the speed of antenna phase-center modulation required to decrease sidelobe sensitivity.

SUMMARY OF THE INVENTION

The above and other objects are achieved in the present invention which comprises an antenna with a movable phase center, a transmitter, a receiver, a pulse expander/compressor and a control unit.

The control unit modulates the position of the antenna phase center so that the phase codes of the expanded pulse echos received from the sidelobes are scrambled. These received echos are routed to the pulse expander/compressor. Since the phase code of these scrambled echos does not match the phase code of the pulse expander compressor, the amplitude of the output signal of the expander/compressor corresponding to the scrambled echo is much lower than the amplitude of a compressed pulse corresponding to an unscrambled echo from the antenna mainlobe. Thus, the effective mainlobe to sidelobe gain ratio of the antenna is increased by the pulse compression ratio of the pulse expander/compressor.

Additionally, since the phase instead of the frequency of the rf pulse is modulated the required speed of phase center modulation is reduced. The use of phase-coded pulses distinguishes the invention from the prior art and allows the utilization of the above-described phase modulation.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION OF THE PREFERRED EMBODIMENTS

The present invention utilizes modulation of the antenna phase center to scramble the phase code of echos reflected from targets in the antenna sidelobes. The phase center of the antenna is the geometric center of the antenna aperture. Upon compression the amplitude of the scrambled echos from targets in the sidelobe direction will be much less than the amplitude of the unscrambled echos from targets in the mainlobe direction.

The principles of the invention are described below in relation to FIG. 1. A preferred embodiment is set forth in FIG. 2.

Figure 1:
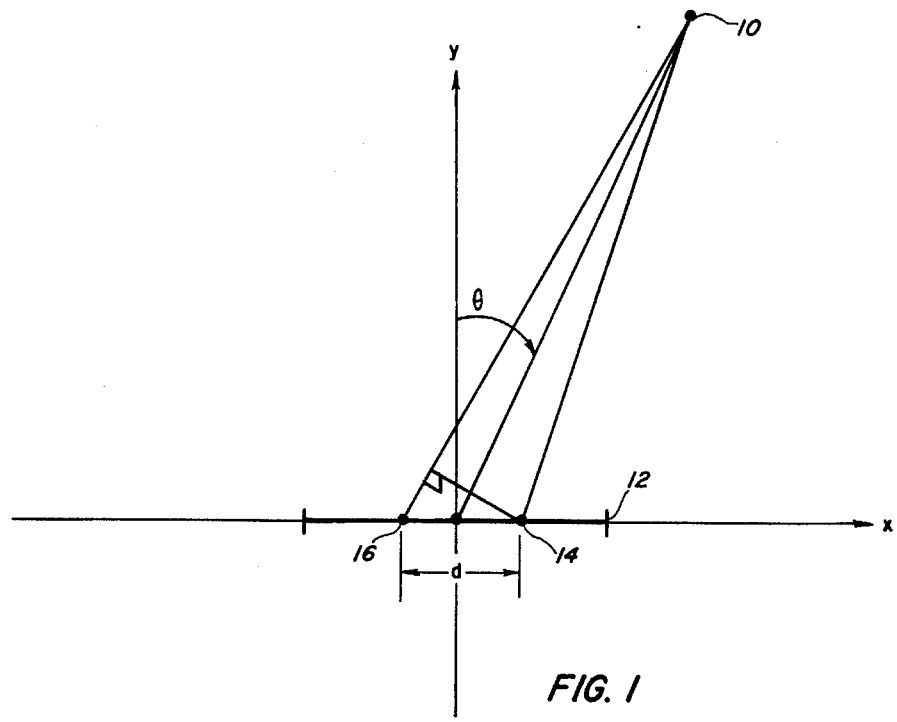
FIG. 1 is a geometric diagram of an antenna and a target.

Referring now to the drawings, wherein like reference numbers designate identical or corresponding parts throughout the several views, and more particularly to FIG. 1 thereof, a geometric diagram of a target 10 and an antenna 12 is set forth. The antenna 12 is disposed along the x-axis of a Cartesian coordinate system with its center at the intersection of the x and y axes. The azimuthal position of a target 10 relative to the antenna 12 is measured from the y axis by the angle o.

As described more fully below, the phase center of the antenna may be mechanically or electronically shifted. If the phase center is shifted from a first position 14 to a second position 16 separated by a distance d, then the phase of the pulse transmitted at angle θ is shifted by an angle φ from the phase of a pulse transmitted along the y axis where $$\phi = Kd \sin\theta \quad (1)$$

and where $K=2\pi/\lambda$ and $\lambda$ is the wavelength of the transmitted pulse.

The phase shift induced by moving the phase-center is utilized to scramble the phase code of an expanded pulse transmitted into a sidelobe. If a phase coded expanded pulse is processed by a pulse expansion/compression network (PECN) matched to the input pulse then the output of the PECN will be a compressed pulse where the ratio of the width of the input expanded pulse to the width of the compressed output pulse is the pulse-compression ratio. However, if the phase code of the expanded input pulse is scrambled, the PECN will not be matched to the input pulse and the PECN output will be an uncompressed pulse. The amplitude of a compressed pulse is greater than the amplitude of an uncompressed pulse by a factor equal to the pulse compression ratio of the PECN. Thus the effective mainlobe to sidelobe gain ratio is increased by the pulse compression ratio. The above-described characteristics of pulse expansion/compression systems are set forth and fully explained in the book by M. Skolnik entitled *Introduction to Radar Systems*, McGraw-Hill, New York, 1980, pp. 420–434.

Figure 2:
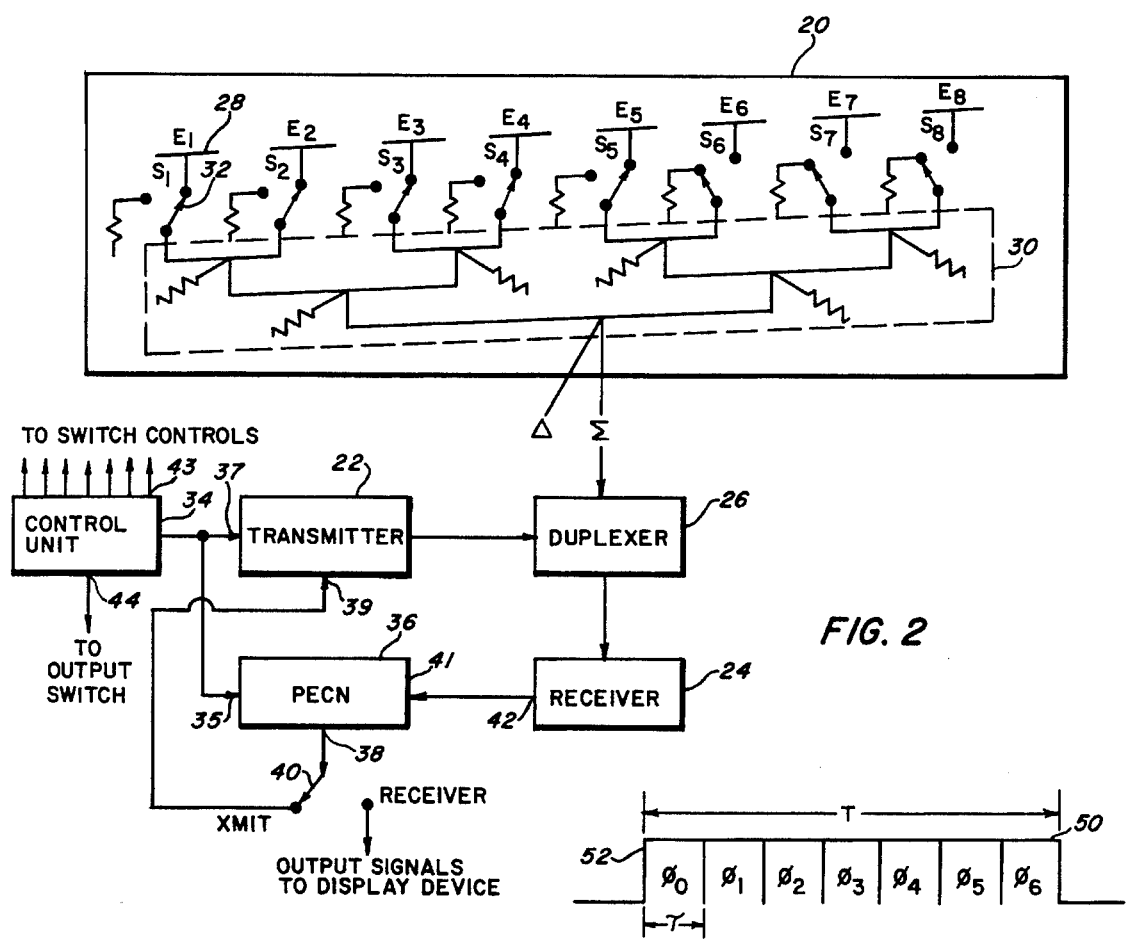
FIG. 2 is a schematic diagram of the preferred embodiment.

FIG. 2 is a schematic diagram of a preferred embodiment. Referring to FIG. 2, an antenna 20 is connected to a transmitter 22 and a receiver 24 by a duplexer 26. The antenna includes eight array-elements 28 designated $E_1-E_8$, connected to a power distributing network 30 by eight switches 32. The switches 32 are designated $S_1-S_8$.

A pulse generating output of a control unit 34 is interconnected to a first input 35 of a PECN 36 and also to a first input 37 of the transmitter 22. The PECN output 38 is alternately interconnected with a second input 39 of the transmitter 22 and a display device (not shown) by an output switch 40. The PECN 36 also includes a second input 41 interconnected with an output 42 of the receiver 26.

The control unit 34 includes eight switch control outputs 43, where each switch control output is interconnected with a switch 32, and a synchronizing output 44 which is interconnected with the output switch 40.

The operation of the embodiment depicted in FIG. 2 will now be described. The phase center of the antenna 20 is located at the geometric center of the antenna aperture, i.e., betwen antenna elements $E_4$ and $E_5$. If some of the antenna elements 28 are inactivated by the switches 32 then the phase center will be moved to the left or right. For example, if elements $E_7$ and $E_8$ are inactivated by switches $S_7$ and $S_8$ then the phase center will be located between $E_3$ and $E_4$. Thus, the position of the phase center may be modulated by activating and inactivating antenna elements 28 with the switches 32.

The PECN 36 generates a phase code sequence, P in response to a pulse generating signal from the control unit 34. This pulse generating signal is simultaneously fed to the transmitter 22 where an rf pulse of predetermined frequency and length is generated. The phase code from PECN 36 is routed to the transmitter 22, via the output switch 40, where the phase code is impressed on the rf pulse by a phase shifter included in the transmitter. The phase coded pulse is transmitted by the antenna and reflected by targets in the mainlobe and sidelobe directions. The reflected echos of the transmitted pulse are received by the antenna 20, processed by the receiver 24 and routed to the second input 41 of the PECN 36. The PECN output is then routed to 19 a display device (not shown) by the output switch 38.

Figure 3:
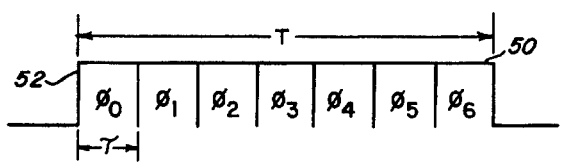
FIG. 3 is a graph of a phase-coded expanded rf pulse.

A typical phase coded expanded pulse is depicted in FIG. 3. A pulse 50 of length T and frequency f is divided into N segments 52 each of length $\tau$. The phase of the signal in the nth segment is equal $\phi_n$.

For purposes of example a phase code, P, with 7 elements, $\phi_0$–$\phi_6$, is depicted.

As described above, if the phase code, P, were scrambled then the amplitude of the PECN output signal would be decreased by the pulse-compression ratio. Thus, since only pulses reflected from targets in the sidelobes are scrambled the effective antenna mainlobe to sidelobe gain ratio is increased by the pulse compression ratio.

Referring back to FIG. 2, a novel means for achieving this phase code scrambling is disclosed. As described with reference to FIG. 1, the phase of the transmitted pulse may be varied by modulating the position of the antenna phase center. Thus if the phase center position is changed from code element-to-code element of the phase coded signal being transmitted, the phase code of pulses transmitted into the sidelobes will be scrambled. An additional phase change of $$\phi_n = Kd \sin \theta_s$$

will be induced from code element to code element where $\theta_s$ is the sidelobe angle. Of course the pulses in the mainlobe will be unscrambled since $\theta_m$, the mainlobe angle, is zero and $$\phi_n = Kd \sin \theta_m = 0$$

This phase center modulation is achieved by activating and inactivating given antenna elements with the switches.

A possible switching sequence for a pulse with seven code element follows:

| Time | Switch Settings(s) | Phase Centers |
| --- | --- | --- |
| 0$\tau$ | $E_1, E_2, E_3, E_4, E_5, E_6$ | $E_3/E_4$ |
| 1$\tau$ | $E_2, E_3, E_4, E_5, E_6, E_7$ | $E_4/E_5$ |
| 2$\tau$ | $E_3, E_4, E_5, E_6, E_7, E_8$ | $E_5/E_6$ |
| 3$\tau$ | $E_1, E_2, E_3, E_4, E_5, E_6, E_7$ | $E_4$ |
| 4$\tau$ | $E_2, E_3, E_4, E_5, E_6, E_7, E_8$ | $E_5$ |
| 5$\tau$ | $E_1, E_2, E_3, E_4, E_5, E_6, E_7$, | $E_4$ |
| 6$\tau$ | $E_1, E_2, E_3, E_4, E_5, E_6, E_7, E_8$ | $E_4/E_5$ |

The switches are activated or inactivated by switch control signals from the control unit 34. Each switch 32 is connected to one of the switch control outputs 43 of the control unit 34. The control unit 34 includes a master oscillator that generates a clock signal for synchronizing the various system components. The switching signal sequence described above may be stored, by way of example, in the read only memory of a microprocessor. The sequence is called according to the time sequence set forth and a switch on control signal is generated at the appropriate switch control outputs 43 of the control unit 34. A control signal from the synchronizing output 44 synchronizes the output switch 40.

The invention has been described for an antenna with eight elements for purposes of illustration and not by way of limitation. Phase center modulation may be employed on transmission, reception or on both. Additionally, while the system has been described with the mainlobe broadside to the antenna, persons skilled in the art will recognize the obvious extension of the principles described herein to a system with the mainlobe steered off broadside.

The phase center may be continuously modulated by replacing the switches with variable power dividers. Phase center modulation may also be accomplished by utilizing a small array to illuminate a focusing second aperture such as a lens or parabolic reflector. The part of the secondary aperture illuminated is changed by rephasing the phased array feed.

The system components required to perform the above-described operations are well-known in the art and are described in the above referenced book by M. Skolnik.

In contrast to existing systems utilizing phase center modulation to achieve frequency modulation of the transmitted waveform, the present invention utilizes phase modulation. This phase modulation requires much slower phase center modulation than required by frequency modulating systems. This difference in speed in phase center modulation reduces the cost and complexity of the system.

Obviously many modifications and variations of the present invention are possible in light of the above teachings. It is therefore to be understood that within the scope of the appended claims the invention may be practiced otherwise than as specifically described.

What is claimed and desired to be secured by Letters Patent of the United States is:

1. A system for increasing the effective mainlobe to sidelobe gain ratio of an antenna comprising:

an antenna for transmitting an output rf pulse and for receiving the echoes of said transmitted rf output pulse from targets in the mainlobe and sidelobes of the antenna;

means for phase coding said output rf pulse transmitted from said antenna with a plurality of stepped phase shifts;

means for scrambling the phase-codes of said echoes reflected from targets in the sidelobes of said antenna to prevent pulse compression; and means for compressing said received echoes from targets in the mainlobe of said antenna.

2. The system recited in claim 1 wherein:

said antenna is a phased array antenna including a plurality of antenna elements and a power distributing network; and said scrambling means includes a plurality of switches, equal to said plurality of antenna elements, wherein each switch interconnects one of said antenna elements with said power distributing network, said switches for activating or deactivating said antenna elements in response to a switch control signal.

3. The system recited in claim 2 wherein:

said scrambling means further includes control means, with outputs connected to said switches, for generating said switch control signals.

4. The system recited in claim 3 wherein:

said control means includes means for modulating the phase center of said antenna.

5. The system recited in claim 4 wherein:

said control unit further includes means for shifting the phase center of said antenna a predetermined distance from code element to code element of said phase coded rf output pulse.

6. A system for increasing the effective mainlobe to sidelobe gain ratio of an antenna comprising:

an antenna, including a plurality of antenna elements and a power distributing network, for transmitting an output rf pulse and for receiving the echoes of said transmitted rf output pulse from targets in the mainlobe and sidelobes of the antenna;

a plurality of switches, equal to said plurality of antenna elements, wherein each switch interconnects one of said antenna elements with said power distributing network, said switches for activating or deactivating said antenna elements in response to a switch control signal, a transmitter, connected to said antenna, for providing said output rf pulse, means for phase coding said output rf pulse with a plurality of stepped phase shifts, a receiver, connected to said antenna, for processing said echoes, a control unit, with outputs interconnected to said switches, for generating said switch control signals and for modulating the position of the phase center of said antenna to-scramble the phase codes of said echoes reflected from targets in the sidelobes of said antenna to prevent pulse compression; and means for compressing said echoes from targets in the mainlobe of said antenna, said compressing means being connected to said receiver.

7. The system recited in claim 6 wherein:

said control unit further includes means for shifting the phase center of said antenna a predetermined distance from code element to code element of said phase coded output rf pulse.

8. A method for increasing the effective mainlobe to sidelobe gain ratio of an antenna comprising the steps of:

generating as output rf pulse;

phase coding said output rf pulse with a plurality of stepped phase shifts;

transmitting said phase coded output rf pulse from said antenna;

receiving the echoes of said transmitted phase coded output rf pulse from targets in the mainlobe and sidelobes of said antenna;

scrambling the phase codes of said echoes from targets in the sidelobes of said antenna; and compressing said echoes from targets in the mainlobe of said antenna.

9. The method recited in claim 8 wherein:

said step of scrambling the phase code includes the step of modulating the phase center of said antenna during said step of transmitting said phase-coded rf output pulse.

10. The method recited in 9 claim wherein:

said step of modulating the phase center includes the step of shifting the phase center of said antenna from code element to code element of said phase coded rf output pulse.

11. The method recited in claim 8 wherein:

said step of scrambling the phase code includes the step of modulating the phase center of said antenna during said step of receiving said phase-coded rf output pulse.

12. The method recited in claim 11 wherein:

said step of modulating the phase center includes the step of shifting the phase center of said antenna from code element to code element of said phase coded pulse.

13. The method recited in claim 8 wherein:

said step of scrambling the phase code includes the step of modulating the phase center of said antenna during said steps of transmitting said phase-coded rf output pulse and of receiving said echos.

14. The method recited in claim 13 wherein:

said step of modulating the phase center includes the step of shifting the phase center of said antenna from code element to code element of said phase coded rf output pulse and of said echos from targets in the sidelobes of said antenna.

15. A system for increasing the effective mainlobe to sidelobe gain ratio of an antenna comprising:

an antenna for transmitting an output rf pulse and for receiving the echoes of said transmitted rf output pulse from targets in the mainlobe and sidelobes of the antenna;

means for phase coding said output rf pulse transmitted from said antenna with a plurality of stepped phase shifts;

means for shifting the phase center of said antenna a predetermined distance from code element to code element of said phase coded rf output pulse to thereby scramble the phase-codes of said echoes reflected from targets in the sidelobes of said antenna and prevent pulse compression; and means for compressing said received echoes from targets in the mainlobe of said antenna.

* * * * *